United States Patent

Smith et al.

[11] Patent Number: 5,919,016
[45] Date of Patent: Jul. 6, 1999

[54] BLIND THREADED NUT

[75] Inventors: Daniel Robin Smith, Birmingham; Donald W Armstrong, West Midlands, both of United Kingdom

[73] Assignee: Emhart Inc., Newark, Del.

[21] Appl. No.: 09/088,497

[22] Filed: Jun. 1, 1998

[30] Foreign Application Priority Data

Jun. 7, 1997 [GB] United Kingdom .................... 9711738
Nov. 15, 1997 [GB] United Kingdom .................... 9724103

[51] Int. Cl.[6] ............................. F16B 13/04; F16B 37/04
[52] U.S. Cl. ............................... 411/34; 411/55; 411/183
[58] Field of Search .................................. 411/34, 36, 37, 411/38, 55, 183, 432, 181

[56] References Cited

U.S. PATENT DOCUMENTS

| 2,409,352 | 10/1946 | Gill | 411/38 |
| 4,007,659 | 2/1977 | Stencel | 411/34 |
| 4,036,098 | 7/1977 | Schruff | 411/34 |
| 4,875,815 | 10/1989 | Phillips, II | 411/55 X |
| 5,569,005 | 10/1996 | Millington | 411/34 |

FOREIGN PATENT DOCUMENTS

| 2515283 | 4/1983 | France | 411/34 |

*Primary Examiner*—Neill Wilson
*Attorney, Agent, or Firm*—Edward D. Murphy

[57] ABSTRACT

A blind fastener system comprises (a) an outer sleeve (2) comprising a flange (4) at one end, which sleeve (2) is provided with a counterbore (9) at the end adjacent to the flange (4), and a relatively thin wall section (8) which extends from the flange (4) and terminates in an abutment surface (12) and;

(b) an inner sleeve (14) having an inner threaded bore (20), which inner sleeve (14) comprises a head portion (16) which terminates in a shoulder (22) and a second portion (18) extending from the head portion (16) towards the operating side (24) of the fastener (10) and having a relatively thin wall (28), which second portion (18) has a shape which matches the shape of the inner bore of the outer sleeve (2).

The inner and outer sleeves (2,14) are adapted to be assembled together so that the abutment surface (12) of the outer sleeve (2) abuts against the shoulder (22) of the inner sleeve (14).

The flange (4) of the outer sleeve (2) has a plain outer diameter, and sleeve portion (23) having a cross-section which is of such a shape that the outer sleeve (2) is restrained from rotation relative to the workpiece (38) in which it is mounted, is provided between the flange (4) and the relatively thin walled section (8).

The second portion (18) of the inner sleeve (14) is provided on its outer face (32) with a profile (30,40) which engages with the inner face (34) of the wall of the flanged portion (4) of the outer sleeve (2) when the fastener (10) has been set.

14 Claims, 2 Drawing Sheets

BLIND THREADED NUT

BACKGROUND OF THE INVENTION

The present invention relates to a blind threaded nut, which has improved resistance to shear and tensile forces and improved resistance to applied torque.

Conventional blind threaded nuts, i.e. nuts that are secured by insertion from one side of the workpiece, have a number of disadvantages when considered for applications where the nut is likely to be subjected to high load and high torque, in spite of having the advantages of easy and low-cost application and a simpler workpiece structure.

In such applications, a weld nut, i.e. a nut which is welded to the blind side of the workpiece and to which a secondary component is bolted, is generally used. The use of weld nuts has the disadvantage that they require more expensive application equipment than conventional blind nuts and, because access is required to the blind side during mounting of the weld nut, this may result in undesirable weakening of the workpiece structure on which the nut is being mounted, especially where the weld nut is being applied to a hollow structural member such as a box section.

Where a conventional blind threaded nut is used in an application where the nut is likely to be subjected to high load and high torque, a number of problems can develop.

Firstly, if the hole in which the nut is mounted has been poorly prepared and has an uneven surface due to burrs etc., then as the setting load is applied to the blind nut, a collapse bulge will start to be formed as normal but as the maximum load is applied, the fixing will tilt as the bulge adapts to the uneven workpiece surface. Secondly, once the bolt is in place and in particular when the joint is being serviced or re-used, an operator may apply excessive torque which will tend further to flatten the collapse bulge and possibly promote cracking of the resultant flattened collapse bulge.

Further, if an excessive shear loading is applied to the joint, then the fixing will initially buckle sideways, the wall of the fixing will shear and the bolt will incline as the shear loading is transferred to the bolt alone. The loading is then translated into combined shear and bending, resulting in premature joint failure.

Further, if an inexperienced operator does not sufficiently torque the bolt, then any sideways thrust is taken on the thread of the fixing, causing a tendency for the collapse bulge to straighten. If a sudden and reverse loading is applied, then the joint will suffer premature failure.

DESCRIPTION OF RELATED ART

It has been proposed in the U.S. Pat. No. 4,007,659 to provide a blind fastener system comprising a ductile sleeve having an expansion portion of small inner diameter in a thin workpiece and having a bulging portion of larger inner diameter extending on the blind side of the workpiece, and a threaded expander member have an expander portion for expanding the sleeve expansion portion and a head portion for bulbously deforming the sleeve bulging portion, both actions occurring on axially pulling the expander member.

This system is said to be particularly suitable for use in blind hole applications where a light weight fastener is required, to fasten together very thin sheets or workpieces, which may be made of relatively soft material.

It is an object of the present invention to provide an improved threaded blind fixing in which the above disadvantages are reduced or substantially obviated.

BRIEF SUMMARY OF THE INVENTION

The present invention provides a blind fastener system which comprises:

(a) an outer sleeve comprising a flange at one end, and a relatively thin wall section which extends from the flange and terminates in an abutment surface, and (b) an inner sleeve having an inner threaded bore, which inner sleeve comprises a head portion which terminates in a shoulder and a second portion extending from the head portion towards the operating side of the fastener and having a relatively thin wall, which second portion has a shape which matches the shape of the inner bore of the outer sleeve, the inner and outer sleeves being adapted to be assembled together so that the abutment surface of the outer sleeve abuts against the shoulder of the inner sleeve, characterized in that the flange of the outer sleeve as a plain outer diameter and comprises a sleeve portion having a cross-section which is of such a shape that the outer sleeve is restrained from rotation relative to the workpiece in which it is mounted, provided adjacent to the relatively thin wall section and in that the second portion of the inner sleeve is provided on its outer wall with a profile which engages with the inner wall of the flanged portion of the outer sleeve when the fastener has been set.

In a preferred embodiment of a blind fastener system according to the present invention, the outer sleeve is provided with a counterbore at the end adjacent to the flange.

In an alternative preferred embodiment of a blind fastener system according to the present invention, the outer sleeve is provided with an internally projecting collar at the end adjacent to the flange.

BRIEF DESCRIPTION OF THE DRAWING

Alternative embodiments of a blind fastener system according to the invention will now be described with reference to the accompanying drawings, in which.

DETAILED DESCRIPTION OF THE INVENTION

Figure 1:
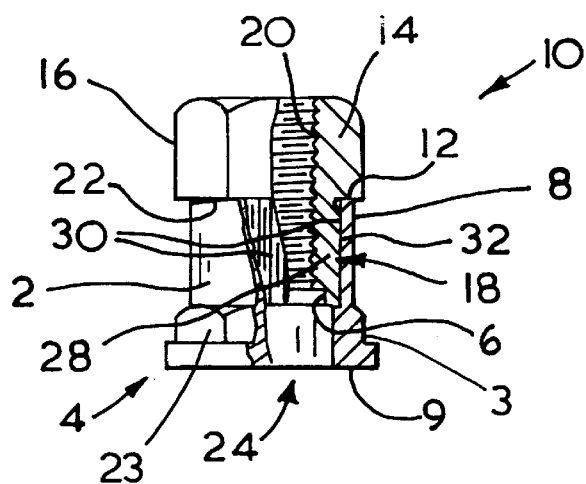
FIG. 1 is a view, partially in section of a first embodiment of an assembled fastener, before setting.

As can be seen in FIG. 1, a fastener system (10) comprises an outer sleeve (2) further comprises a thin wall section (8) which extends from the flange (4) and terminates in an abutment surface (12). The flange (4) includes a sleeve portion (23) adjacent to the thin wall section (8).

The fastener (10) further comprises an inner sleeve (14), comprising a hexagonal head portion (16) and a second portion (18) and having an inner threaded bore (20). The head portion (16) terminates in a shoulder (22).

The second portion (18) extends from the head portion (16) towards the operating side (24) of the fastener (10). The inner threaded bore (20) of the inner sleeve (14) terminates at the operating end (24) of the fastener in a counter bore (6). The wall (28) of the second portion (18) has an external shape which is a slight interference fit with the inner bore of the outer sleeve (2).

When the inner sleeve (14) and outer sleeve (2) are assembled together, the abutment surface (12) of the outer sleeve (2) abuts against the shoulder (22) of the inner sleeve (14).

The sleeve portion (23) of the flange (4) is externally shaped as a hexagon.

A plurality of splines (30) are formed on the outer face (32) of the second portion (18) of the inner sleeve (14).

Figure 2:
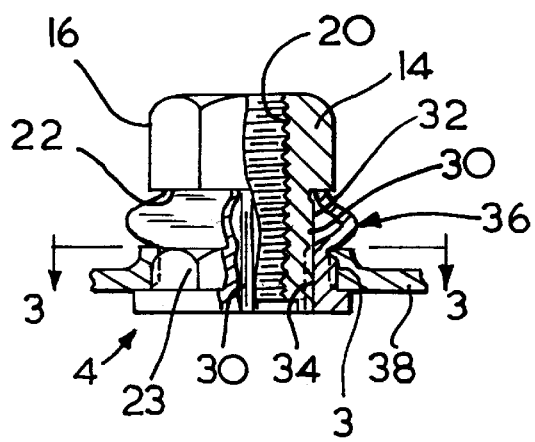
FIG. 2 is a view, partially in section, of a set fastener, showing the embodiment of FIG. 1.
Figure 3:
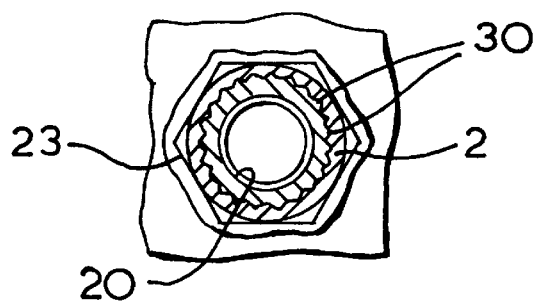
FIG. 3 is a cross-section on the line 3—3 of FIG. 2.

As can be seen from FIG. 2, the fastener (10) is set in known manner. The fastener (10) is threaded onto a mandrel of a setting tool so that flange (4) of the outer sleeve (2) abuts on the nosepiece of the setting tool and an axial load is applied. As the inner sleeve (14) is drawn towards the nosepiece of the setting tool, the shoulder (22) of the inner sleeve (2) and an upset of the thin wall section (8) of the outer sleeve (2) takes place.

The setting is now complete and can be verified by ascertaining that the threaded inner portion is in close proximity with the outer face of the flanged portion of the outer sleeve.

A bulge (36) is formed on the blind side of a workpiece (38) by the upset of the thin wall section (8), so that the workpiece (38) is trapped between the bulge (36) and the flange (4).

The splines (30) cause the surface (3) of the outer wall of the sleeve portion (23) of the flange (4) to expand to fill the hexagon shaped hole in the workpiece. The splines (30) also deform the shape of the sleeve portion (23) of the flange (4) by providing small bulges in the flats of the hexagon which will further engage or embed in the workpiece. This will further enhance the resistance to any applied torque and provide a further resistance to fretting resulting from rotational forces.

Figure 4:
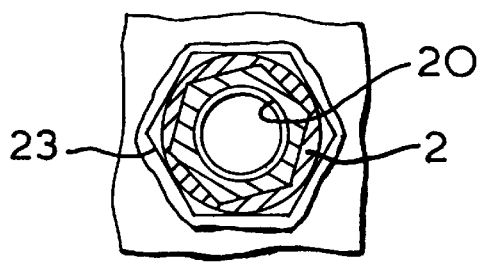
FIG. 4 is a similar section to that of FIG. 3, but of the second embodiment of the fastener.

In alternative embodiment of the fastener (10), as can be seen from FIG. 4, the profile of the outer face (32) of the second portion (18) and of the inner sleeve (14) comprises a hexagon (40), which operates in a similar manner to the splines (30) to cause the surface (3 of the outer wall of the sleeve portion (23) of the flange (4) to expand to fill the hexagon shaped hole in the workpiece (38).

Figure 5:
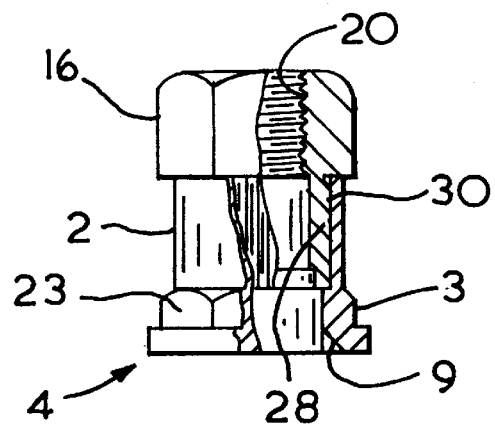
FIG. 5 is a view, partially in section of a third embodiment of an assembled fastener, before setting.

As can be seen in FIG. 5, the fastener system (10) comprises an outer sleeve (2) with a flange (4) at one end. At the end adjacent to the flange (4), the outer sleeve (2) has an internal counter bore (9).

The rest of the fastener assembly (10) is as described with reference to FIGS. 1 to 4.

Setting takes place as described above, except that as setting progressively takes place, the plain cylindrical portion of the inner sleeve engages the shaped nosepiece of the setting tool and is caused to deform into the counterbore portion (9) of the flange (4) of the outer sleeve (2).

Figure 6:
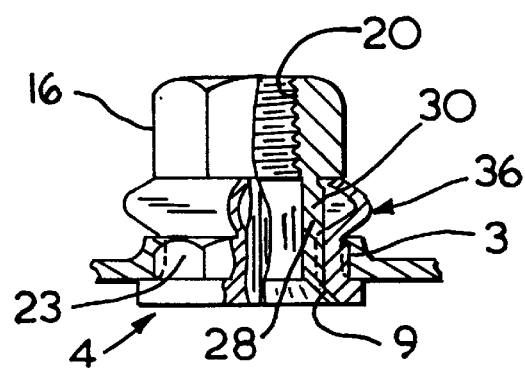
FIG. 6 is a view, partially in section, of a set fastener, showing the embodiment of FIG. 5.

The fastener assembly of FIGS. 5 and 6 is particularly suitable for use in applications where the fastener is to be subjected to particularly high load and high torque.

Figure 7:
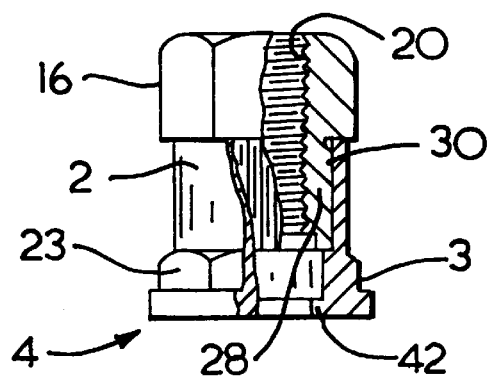
FIG. 7 is a view, partially in section, of a fourth embodiment of an assembled fastener before setting.

As can be seen in FIG. 7, a further preferred embodiment of a fastener system (10) comprises an outer sleeve (2) with a flange (4) at one end. At the end adjacent to the flange (4), the outer sleeve (2) has an internally projecting collar (42).

The rest of the fastener assembly (10) is an described above with reference to FIGS. 1 to 4, and setting takes place in a similar way.

Figure 8:
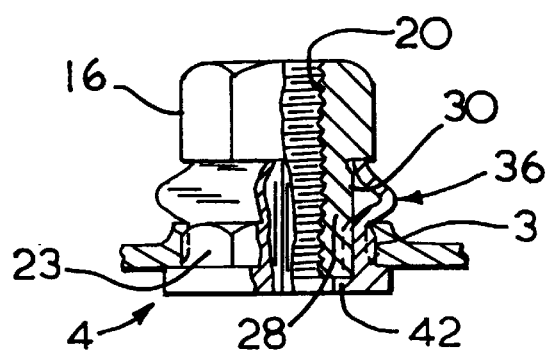
FIG. 8 is a view partially in section of a set fastener, showing the embodiment of FIG. 7.

The fastener assembly (10) of FIGS. 7 and 8 is particularly suitable for use where there is a size variation in the diameter of the hole in the workpiece to which the fastener is to be attached, since a single size of fastener can be used over a wider variety of workpiece hole diameters.

What is claimed is:

1. A blind fastener system which comprises:
   (a) an outer sleeve (2) comprising a flange (4) at one end, and a relatively thin wall section (8) which extends from the flange and terminated in an abutment surface (12) and;
   (b) an inner sleeve (14) having an inner threaded bore (20), which inner sleeve (14) comprises a head portion (16) which terminates in a shoulder (22) and a second portion (18) extending from the head portion (16) towards the operating side (24) of the fastener (10) and having a relatively thin wall (28), which second portion (18) has a shape which matches the shape of the inner bore of the outer sleeve (2), said head portion (16) having a hexagonal cross-section,
   the inner and outer sleeves (2,14) being adapted to be assembled together so that the abutment surface (1 2) of the outer sleeve (2) abuts against the shoulder (22) of the inner sleeve (14),
   characterized in that the flange (4) of the outer sleeve (2) has a plain outer diameter and comprises a sleeve portion (23) having a cross-section which is of such a shape that the outer sleeve (2) is restrained from rotation relative to the workpiece (38) in which it is mounted, provided adjacent to the relatively thin walled section (8), and
   in that the second portion (18) of the inner sleeve (14) is provided on its outer face (32) with a profile (30,40) which engages with the inner face (34) of the wall of the flanged portion (4) of the outer sleeve (2) when the fastener (10) has been set.

2. A blind fastener system according to claim 1, characterized in the outer sleeve (2) is provided with a counterbore (9) at the end adjacent to the flange (4).

3. A blind fastener system according to claim 1, characterized in that the outer sleeve (2) is provided with an internally projecting collar (42) at the end adjacent to the flange (4).

4. A blind fastener system according to claim 1 characterized in that the sleeve portion (23) is of hexagonal cross-section.

5. A blind fastener according to claim 1 characterized in that the profile comprises one or more splines (30).

6. A blind fastener according to claim 1 characterized in that the profile comprises a hexagon (40).

7. A blind fastener system comprising:
   (a) an outer sleeve (2) comprising a flange (4) at one end, a relatively thin wall section (8) said section extending from said flange (4) terminating in an abutment surface (12); and
   (b) an inner sleeve (14) having an inner threaded bore (20), said inner sleeve (14) comprising a head portion (16) terminating in a shoulder (22) and a second portion (18) extending away from said head portion (16) towards said flange (4), said second portion having an exterior shape which matches the shape of the inner bore of the outer sleeve (2);
   said head portion (1 6) having a non-circular cross-section including a plurality of straight surfaces intersecting at corners.

8. A blind fastener system according to claim 7, characterized in the outer sleeve (2) is provided with a counterbore (9) at the end adjacent to the flange (4).

9. A blind fastener system according to claim 7, characterized in that the outer sleeve (2) is provided with an internally projecting collar (42) at the end adjacent to the flange (4).

10. A blind fastener system according to claim 7, characterized in that the head portion (16) of the inner sleeve (14) has a hexagonal cross-section.

11. A blind fastener according to claim 7, characterized in that the profile comprises one or more splines (30).

12. A blind fastener system which comprises:

(a) an outer sleeve (2) comprising a flange (4) at one end, and a relatively thin wall section (8) which extends from the flange (4) and terminates in an abutment surface (12) and;

(b) an inner sleeve (14) having an inner threaded bore (20), which inner sleeve (14) comprises a head portion (16) which terminates in a shoulder (22) and a second portion (18) extending from the head portion (16) towards the operating side (24) of the fastener (10) and having a relatively thin wall (28), which second portion (18) has a shape which matches the shape of the inner bore of the outer sleeve (2), the inner and outer sleeves (2,14) being adapted to be assembled together so that the abutment surface (12) of the outer sleeve (2) abuts against the shoulder (22) of the inner sleeve (14), characterized in that the flange (4) of the outer sleeve (2) has a plain outer diameter and comprises a sleeve portion (23) having a cross-section which is of such a shape that the outer sleeve (2) is restrained from rotation relative to the workpiece (38) in which it is mounted, provided adjacent to the relatively thin walled section (8), and in that the second portion (18) of the inner sleeve (14) is provided on its outer face (32) with a hexagonal profile (40) which engages with the inner face (34) of the wall of the flanged portion (4) of the outer sleeve (2) when the fastener (10) has been set.

13. A blind fastener system according to claim 12, characterized in that the sleeve portion (23) is of hexagonal cross-section.

14. A blind fastener system according to claim 12, characterized in that the head portion (16) of the inner sleeve (14) has a hexagonal cross-section.

* * * * *